US010107973B2

(12) United States Patent
Sano et al.

(10) Patent No.: US 10,107,973 B2
(45) Date of Patent: Oct. 23, 2018

(54) OPTICAL CROSS-CONNECT COMPONENT

(71) Applicant: SUMITOMO ELECTRIC INDUSTRIES, LTD., Osaka-shi, Osaka (JP)

(72) Inventors: Tomomi Sano, Yokohama (JP); Hiroo Kanamori, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/477,227

(22) Filed: Apr. 3, 2017

(65) Prior Publication Data

US 2017/0293092 A1  Oct. 12, 2017

(30) Foreign Application Priority Data

Apr. 6, 2016 (JP) .................................. 2016-076612

(51) Int. Cl.
*G02B 6/38* (2006.01)
*G02B 6/44* (2006.01)

(52) U.S. Cl.
CPC .......... *G02B 6/3885* (2013.01); *G02B 6/382* (2013.01); *G02B 6/3882* (2013.01); *G02B 6/4453* (2013.01)

(58) Field of Classification Search
CPC .... G02B 6/3885; G02B 6/382; G02B 6/3882; G02B 6/4453
See application file for complete search history.

(56) References Cited

U.S. PATENT DOCUMENTS

| 4,252,407 | A | * | 2/1981 | Bubanko | ............... | G02B 6/383 |
| | | | | | | 385/59 |
| 4,296,999 | A | * | 10/1981 | Mead | ....................... | G02B 6/32 |
| | | | | | | 385/61 |
| 5,259,050 | A | * | 11/1993 | Yamakawa | .......... | G02B 6/3885 |
| | | | | | | 385/114 |
| 6,352,372 | B1 | * | 3/2002 | Shahid | ................ | G02B 6/3879 |
| | | | | | | 385/136 |
| 7,212,703 | B2 | * | 5/2007 | Wu | ....................... | G02B 6/3556 |
| | | | | | | 385/16 |

(Continued)

FOREIGN PATENT DOCUMENTS

| DE | 102011008122 A1 * | 11/2011 | ........... G02B 6/3542 |
| DE | 102011008122 B4 * | 2/2012 | ........... G02B 6/3542 |

(Continued)

*Primary Examiner* — Peter Radkowski
(74) *Attorney, Agent, or Firm* — Drinker Biddle & Reath LLP

(57) ABSTRACT

An optical cross-connect component mutually connecting an end of a first optical fiber group and an end of a second optical fiber group is disclosed. The optical cross-connect component includes a plurality of first connectors housing therein the end of the first optical fiber group, and a plurality of second connectors housing therein the end of the second optical fiber group. The m×n optical fibers in the first optical fiber group are housed in any of the plurality of first connectors, and the m×n optical fibers in the second optical fiber group are housed in any of the plurality of second connectors. The end of the first optical fiber group and the end of the second optical fiber group are connected so as to be butted to each other.

7 Claims, 8 Drawing Sheets

(56) References Cited

U.S. PATENT DOCUMENTS

| | | | | |
|---|---|---|---|---|
| 7,331,802 B2* | 2/2008 | Rothermel | ............ | H01R 12/585 439/108 |
| 7,373,037 B2* | 5/2008 | Wu | ...................... | G02B 6/3556 385/16 |
| 8,517,614 B1* | 8/2013 | Wach | ...................... | G02B 6/38 385/59 |
| 8,768,116 B2* | 7/2014 | McColloch | .......... | G02B 6/3636 385/24 |
| 2003/0174998 A1* | 9/2003 | Shevchuk | ............ | G02B 6/3885 385/137 |
| 2007/0036480 A1* | 2/2007 | Wu | ...................... | G02B 6/3556 385/16 |
| 2007/0099455 A1* | 5/2007 | Rothermel | ............ | H01R 12/585 439/108 |
| 2008/0080810 A1* | 4/2008 | Wu | ...................... | G02B 6/3556 385/16 |
| 2008/0214059 A1* | 9/2008 | Rothermel | ......... | H01R 13/6477 439/701 |
| 2008/0304794 A1* | 12/2008 | Kato | .................... | G02B 6/3846 385/80 |
| 2011/0317969 A1* | 12/2011 | Dangel | .................. | G02B 6/448 385/114 |
| 2014/0010499 A1* | 1/2014 | Suematsu | ............ | G02B 6/3881 385/65 |
| 2014/0093211 A1* | 4/2014 | McColloch | .......... | G02B 6/3636 385/74 |

FOREIGN PATENT DOCUMENTS

| | | | |
|---|---|---|---|
| JP | 11072652 A | * | 3/1999 |
| JP | 2003329887 A | * | 11/2003 |

\* cited by examiner

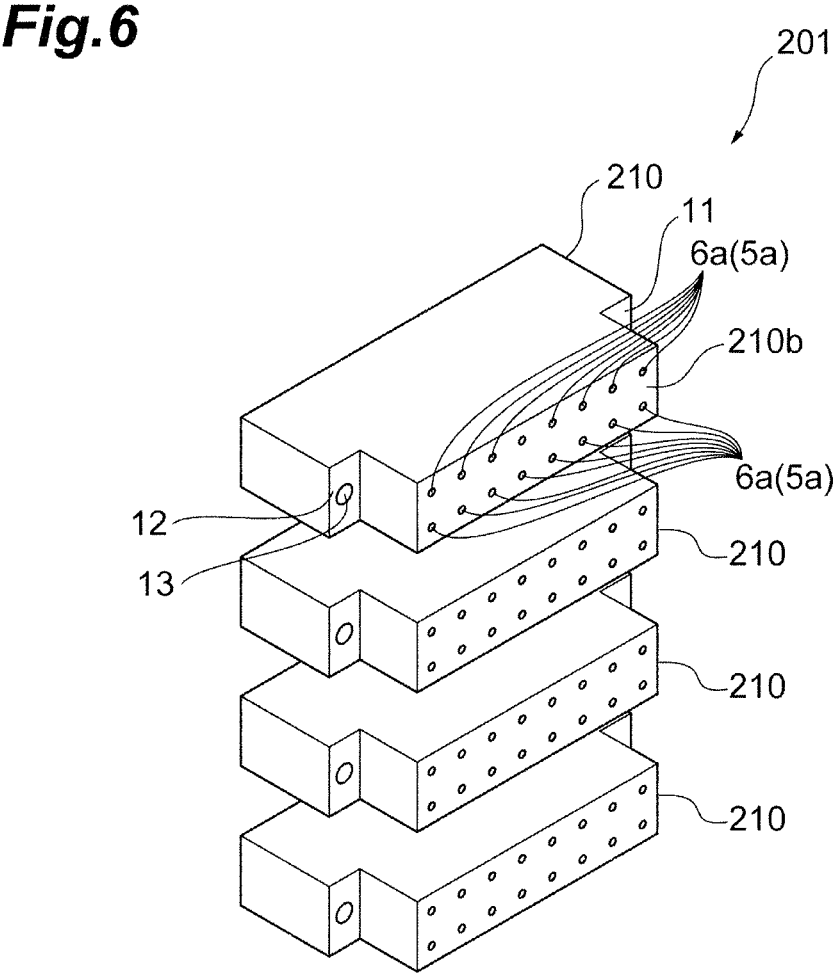

OPTICAL CROSS-CONNECT COMPONENT

CROSS REFERENCE TO RELATED APPLICATIONS

This application is based upon and claims the benefit of priority from Japanese Patent Application No. 2016-076612, filed on Apr. 6, 2016; the entire contents of which are incorporated herein by reference.

TECHNICAL FIELD

The present invention relates to an optical cross-connect component.

BACKGROUND

An optical signal processing device such as a reconfigurable optical add/drop multiplexer (ROADM) has been known in a field of a wavelength division multiplexing (WDM) optical communication. The processing device requires a wiring structure for dividing input WDM signals for each wavelength and collecting respective divided signal components for each wavelength.

U.S. Pat. No. 8,768,116 disclosed an optical cross-connect mechanism including a first connector stack stacked in one direction and a second connector stack stacked in another direction orthogonal to the relevant one direction, as the above wiring structure. This mechanism provides a lens to a tip end of each of optical fibers held by the first connector stack and the second connector stack.

SUMMARY

In accordance with one aspect of the invention, an optical cross-connect component mutually connects an end of a first optical fiber group and an end of a second optical fiber group, each of the first and second optical fiber groups having m×n optical fibers arranged in a matrix of m rows×n columns at the ends, wherein m and n each represents an integer equal to or more than two. The optical cross-connect component includes a plurality of first connectors housing therein the end of the first optical fiber group, and a plurality of second connectors housing therein the end of the second optical fiber group. The m×n optical fibers in the first optical fiber group are housed in any of the plurality of first connectors, and one first connector of the plurality of first connectors collectively houses therein n optical fibers arranged in at least any one row of the m rows. The m×n optical fibers in the second optical fiber group are housed in any of the plurality of second connectors, and one second connector of the plurality of second connectors collectively houses therein m optical fibers arranged in at least any one column of the n columns. The end of the first optical fiber group and the end of the second optical fiber group are connected so as to be butted to each other.

BRIEF DESCRIPTION OF THE DRAWINGS

The foregoing and other purposes, aspects and advantages will be better understood from the following detailed description of embodiments of the invention with reference to the drawings, in which:

FIG. 6 is a perspective view showing connectors in an optical cross-connect component according to another embodiment.

DETAILED DESCRIPTION

Figure 1:
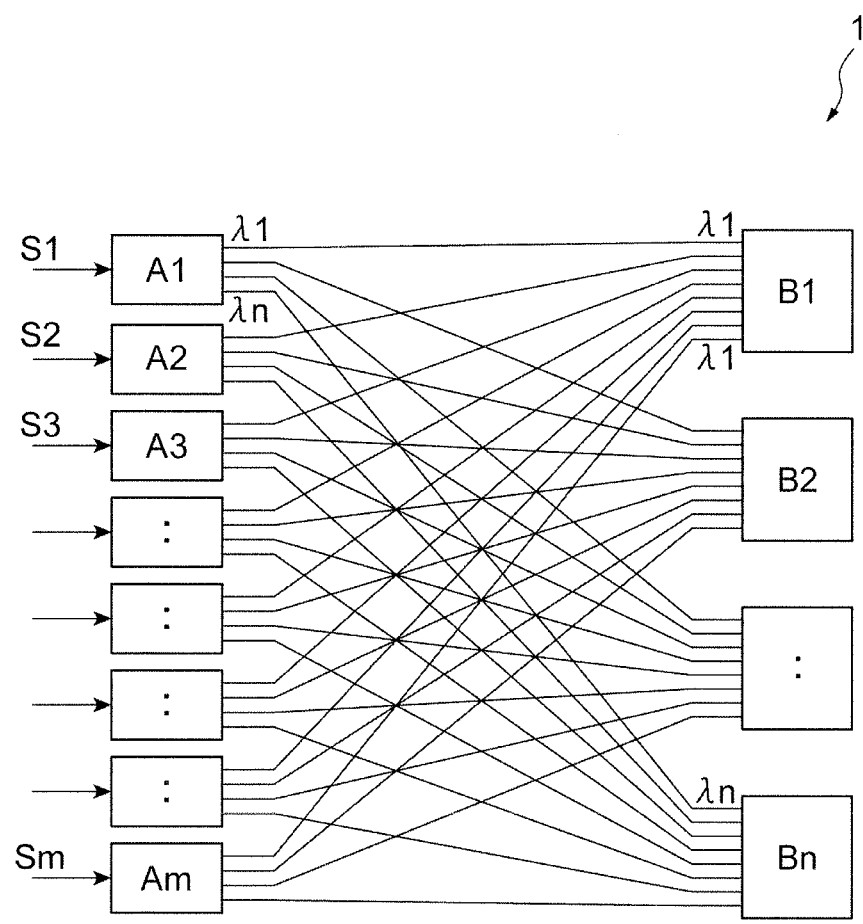
FIG. 1 is a conceptual diagram for illustrating a wiring structure of an optical cross-connect component according to one embodiment.

Description of Embodiment of the Present Application Invention

Content of embodiments of the present invention is listed and described. An optical cross-connect component according to one embodiment of the present invention is an optical cross-connect component mutually connecting an end of a first optical fiber group and an end of a second optical fiber group, each of the first and second optical fiber groups having m×n (m by n) optical fibers arranged in a matrix of m rows×n columns at the ends, wherein m and n each represents an integer equal to or more than two. The optical cross-connect component includes a plurality of first connectors housing therein the end of the first optical fiber group, and a plurality of second connectors housing therein the end of the second optical fiber group. The m×n optical fibers in the first optical fiber group are housed in any of the plurality of first connectors, and one first connector of the plurality of first connectors collectively houses therein n optical fibers arranged in at least any one row of the m rows. The m×n optical fibers in the second optical fiber group are housed in any of the plurality of second connectors, and one second connector of the plurality of second connectors collectively houses therein m optical fibers arranged in at least any one column of the n columns. The end of the first optical fiber group and the end of the second optical fiber group are connected so as to be butted to each other.

The optical cross-connect component connects one first connector with all the second connectors each other by connecting each of the n optical fibers housed in the one first connector to any of a plurality of second connectors. Each of the second connectors is connected with the optical fibers from each of a plurality of first connectors, and thereby specified signals can be collected from the respective first connectors to one second connector. In addition, the optical cross-connect component mutually connects the end of the first optical fiber group and the end of the second optical fiber group so as to be butted to each other without via a lens. Therefore, there is no restriction by an outside diameter of the lens, and thus, it is possible to easily increase a density of the optical fiber and further reduce a coupling loss.

In the optical cross-connect component according to one aspect, the plurality of first connectors may be m first connectors, each first connector collectively housing therein the n optical fibers arranged in each row at the end of the first optical fiber group, and the plurality of second connector may be n second connectors, each second connector collectively housing therein the m optical fibers arranged in each column at the end of the second optical fiber group.

In such an optical cross-connect component, the ends of the n optical fibers housed in the first connector are respectively connected with the ends of the optical fibers of the n second connectors different from each other. In other words, the ends of the m optical fibers housed in the second connector are respectively connected with the ends of the optical fibers housed in the m first connectors different from each other. Each of the second connectors is connected with the optical fibers from each of the m first connectors, and thereby specified signals can be collected from the respective first connectors to one second connector. In addition, in this optical cross-connect component, the end of the first optical fiber group and the end of the second optical fiber group are connected so as to be butted to each other without via a lens. Therefore, there is no restriction by an outside diameter of the lens, and thus, it is possible to easily increase a density of the optical fiber and further reduce a coupling loss.

The optical cross-connect component according to one aspect may further include an adapter fixing at least one first connector of the plurality of first connectors and fixing at least one second connector of the plurality of second connectors. The adapter is configured to be fixed with both the first and the second connectors, thereby positioning of the first connector and the second connector can be easily carried out.

In the optical cross-connect component according to one aspect, the adapter may have a frame including one end face and other end face opposite to the one end face. The frame may have one or more guide holes on the one end face for being connected to the first connectors via guide pins and one or more guide holes on the other end face for being connecting to the second connectors via a guide pins. Since the first connectors and the second connectors are connected to the adapter by the guide pins, positioning of the first connectors and the second connectors can be easily and accurately carried out.

In the optical cross-connect component according to one aspect, the end of the first optical fiber group and the end of the second optical fiber group may be butted to each other via a refractive index matching material. It is possible to hold stably an optical connection between the end of the optical fiber on one side and the end of the optical fiber on the other side.

In the optical cross-connect component according to one aspect, two first connectors positioned on both ends in a column direction may have n guide holes for being connected with the n second connectors via guide pins, and the two second connectors positioned on both ends in a row direction may respectively have m guide holes for being connected with the m first connectors via guide pins. Since the first connectors and the second connectors are directly connected via the guide pins, positioning of the first connectors and the second connectors can be easily and accurately carried out.

Detail of Embodiments of the Present Application Invention

Specific examples of an optical cross-connect component according to embodiments of the invention are described below with reference to the drawings. The invention is not limited to the examples, and is intended to include the meanings shown in the Claims and equivalent to the Claims, and all changes in a scope thereof. In the following description, the same components in description of the drawings are designated by the same reference signs, and the duplicated description is omitted.

First Embodiment

First, a description is given of a basic concept of a wiring structure of the optical cross-connect component according to an aspect. FIG. 1 is a conceptual diagram for illustrating a wiring structure of an optical cross-connect component. As shown in FIG. 1, the optical cross-connect component has m first connectors A1 to Am (m represents an integer equal to or more than two) and n second connectors B1 to Bn (n represents an integer equal to or more than two). Here, for example, n signal components λ1 to λn obtained by dividing, for each wavelength, WDM signals S1 to Sm different from each other are input to the first connectors A1 to Am. In this case, the first connectors A1 to Am and the second connectors B1 to Bn are connected with each other such that the signal components λ1 to λn output from the first connectors A1 to Am are collected into the second connectors B1 to Bn for each wavelength. For example, the signal components λ1 output from the first connectors A1 to Am are all input to the second connector B1. In the embodiment, ends of the optical fibers housed in the first connectors A1 to Am are connected so as to be butted to ends of the optical fibers housed in the second connectors B1 to Bn, which achieves the above wiring structure.

Next, a description is given of an example of specific configurations of the optical cross-connect component. The optical cross-connect component in the embodiment mutually connects ends for a pair of optical fiber groups, the ends being of m×n optical fibers arranged in each optical fiber group in a matrix of m rows×n columns. The optical cross-connect component includes the first connectors in number of m each collectively housing therein the n optical fibers arranged in each row at the ends for first optical fiber group, and the second connectors in number of n each collectively housing therein the m optical fibers arranged in each column at the ends for the second optical fiber group. In the optical cross-connect component, the end of the first optical fiber group and the end of the second optical fiber group are connected so as to be butted to each other. Hereinafter, a description is given of an example where both m and n are "eight". That is, a description is given of an example where ends 5a for an optical fiber group 5 consisting of optical fibers arranged in a matrix of eight rows×eight columns are connected with ends 25a for an optical fiber group 25 also consisting of optical fibers arranged in a matrix of eight rows×eight columns.

Figure 2:
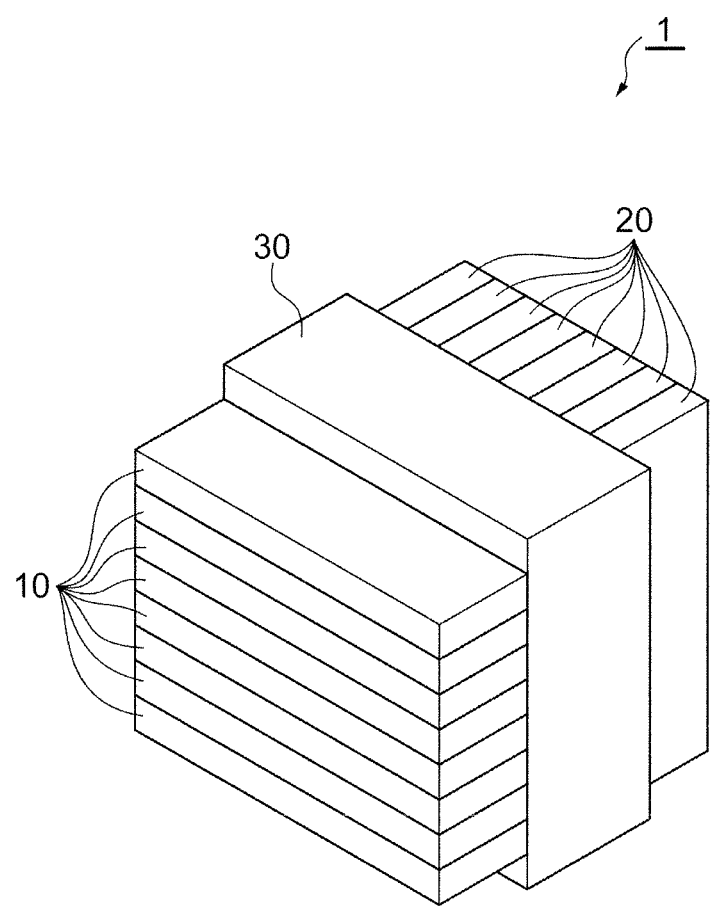
FIG. 2 is a perspective view showing an optical cross-connect component according to one embodiment.

FIG. 2 is a perspective view schematically showing an optical cross-connect component according to an embodiment. As shown in FIG. 2, an optical cross-connect component 1 includes eight first connectors 10, eight second connectors 20, and an adapter 30. The first connectors 10 correspond to the first connectors A1 to A8, and the second connectors 20 correspond to the second connectors B1 to B8. Both the first connector 10 and the second connector 20 are plate-shaped. In the optical cross-connect component 1, eight first connectors 10 are stacked in the column direction and eight second connectors 20 are stacked in the row direction. Then, the first connectors 10 and the second connectors 20 are connected with each other by the adapter 30. In FIG. 2, 64 (m×n) optical fibers housed in the first connectors 10 and second connectors 20 are omitted, but the ends of these 64 optical fibers are arranged in a matrix of eight rows×eight columns. Hereinafter, a description is given in detail of the first connector 10, the second connector 20, and the adapter 30.

Figure 3A:
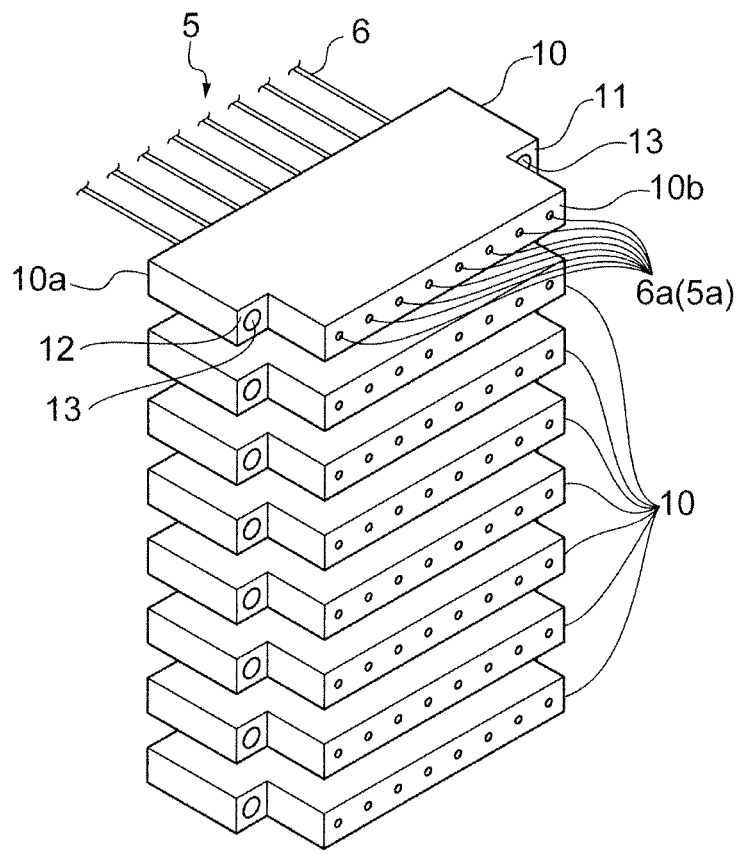
FIG. 3A is a perspective view showing first connectors in the optical cross-connect component of FIG. 2.

FIG. 3A is a perspective view showing the first connectors. In FIG. 3A, optical fibers 6 are depicted only for one first connector 10, and the optical fibers 6 are omitted for other seven first connectors 10. The optical fiber group 5 is constituted by 64 optical fibers 6 housed in eight first connectors 10. The first connector 10, which is, for example, a ferrule having inside thereof a plurality of parallel optical fiber holding holes, collectively houses ends of eight optical fibers 6 arranged in the row direction. A contour of the first connector 10 is plate-shaped extending in the row direction. The first connector 10 has an end face 10a where the optical fibers 6 are inserted and an end face 10b in an opposite side of the end face 10a. At an end 6a of the optical fiber 6, a bare optical fiber is exposed by eliminating a resin coating, and this exposed bare optical fiber is housed in the first connector 10. At the end face 10b, the end 6a of the optical fiber 6 housed in the first connector 10 is exposed. For example, the end 6a can protrude from the end face 10b.

At both end sides in the row direction of the first connector 10, steps 11 and 12 are formed each at which a side of the end face 10b is recessed toward the end face 10a side. A guide hole 13 is formed on each of the steps 11 and 12. The guide hole 13 may be mated with a guide pin (see FIG. 4) for connecting with the adapter 30. In the embodiment, a pair of guide holes 13 is formed at the steps 11 and 12 of the first connector 10 along an optical axis direction.

Figure 3B:
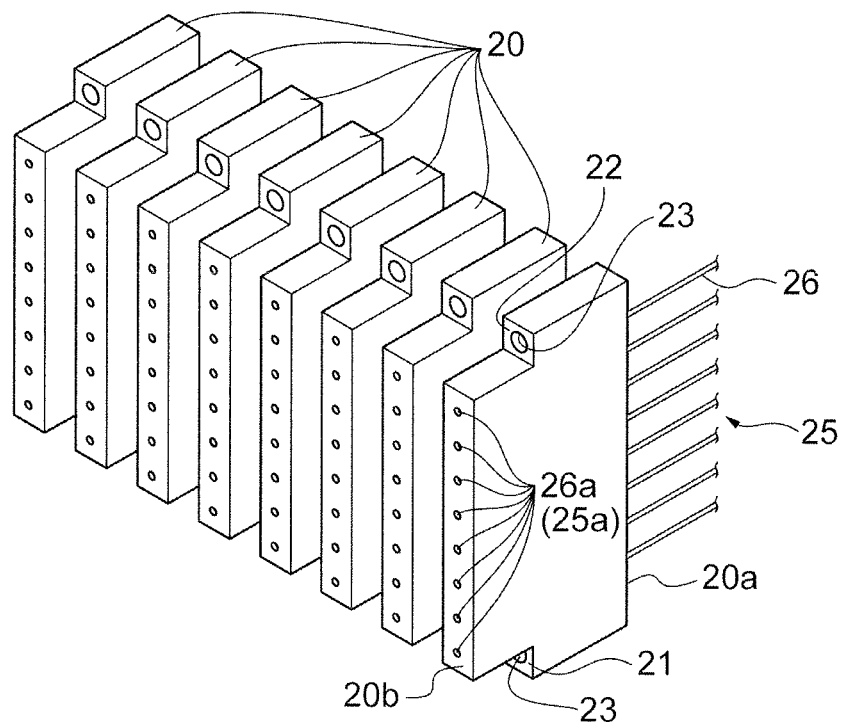
FIG. 3B is a perspective view showing second connectors in the optical cross-connect component of FIG. 2.

FIG. 3B is a perspective view showing the second connector in the optical cross-connect component. In FIG. 3B, optical fibers 26 are depicted only for one second connector 20, and the optical fibers 26 are omitted for other seven second connectors 20. The optical fiber group 25 is constituted by 64 optical fibers 26 housed in eight second connectors 20. The second connector 20, which is, for example, a ferrule, collectively houses ends of eight optical fibers 26 arranged in the column direction. A contour of the second connector 20 is plate-shaped extending in the column direction. The second connector 20 has an end face 20a where the optical fibers 26 are inserted and an end face 20b on an opposite side of the end face 20a. At an end 26a of the optical fiber 26, a bare optical fiber is exposed by eliminating a resin coating, and this exposed bare optical fiber is housed in the second connector 20. At the end face 20b, the end 26a of the optical fiber housed in the second connector 20 is exposed. For example, the end 26a can protrude from the end face 20b.

At both end sides of the second connector 20 in the column direction, steps 21 and 22 are formed each at which a side of the end face 20b is recessed toward the end face 20a side. A guide hole 23 is formed on each of the steps 21 and 22. The guide hole 23 may be mated with a guide pin (see FIG. 4) for connecting with the adapter 30. In the embodiment, a pair of guide holes 23 is formed at the steps 21 and 22 of the second connector 20 along an optical axis direction.

In the embodiment, lengths in the row direction and column direction are the same of a face defined by eight end faces 10b in a state where the first connectors 10 are stacked and a face defined by eight end faces 20b in a state where the second connectors 20 are stacked. In the state where the first connectors 10 are stacked, a pitch of the ends 6a of 64 optical fibers 6 is the same length in the row direction and column direction. Similarly, in the state where the second connectors 20 are stacked, a pitch of the ends 26a of 64 optical fibers 26 is the same length in the row direction and column direction. Then, a pitch of the optical fibers 6 on the first connector 10 is the same as a pitch of the optical fibers 26 on the second connector 20.

Figure 4:
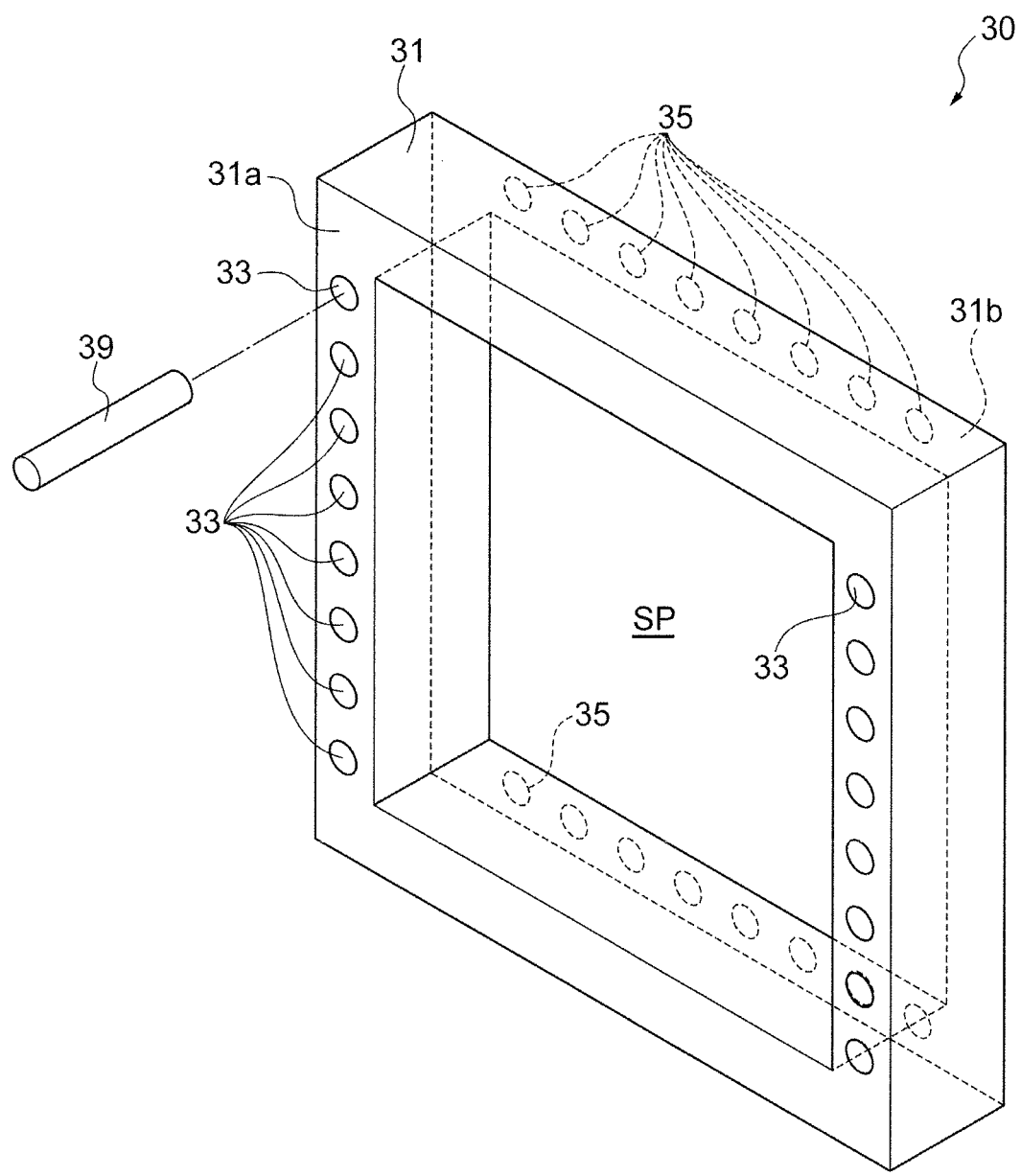
FIG. 4 is a perspective view showing an adapter.

FIG. 4 is a perspective view showing an adapter. The adapter 30 includes a frame 31 to which eight first connectors 10 and eight second connectors 20 are fixed. The frame 31 is rectangular-shaped having a space SP in a center thereof. The frame 31 includes an end face (one end face) 31a surrounding the space SP and an end face (the other end face) 31b in an opposite side of the end face 31a. A plurality of guide holes 33 are formed on the end face 31a. In the embodiment, the guide hole 33 of the frame 31 is connected with the guide hole 13 of the first connector 10 by way of a guide pin 39. Therefore, the guide holes 33 are formed in number of eight corresponding to eight first connectors 10 respectively on both end sides in the row direction (in a horizontal direction) on the end face 31a. The guide holes 33 are aligned in the column direction (in a vertical direction).

A plurality of guide holes 35 are formed on the end face 31b. In the embodiment, the guide hole 35 of the frame 31 is connected with the guide hole 23 of the second connector 20 by way of the guide pin 39. Therefore, the guide holes 35 are formed in number of eight corresponding to eight second connectors 20 respectively on both end sides in the column direction on the end face 31b. The guide holes 35 are aligned in the row direction.

Figure 8A:
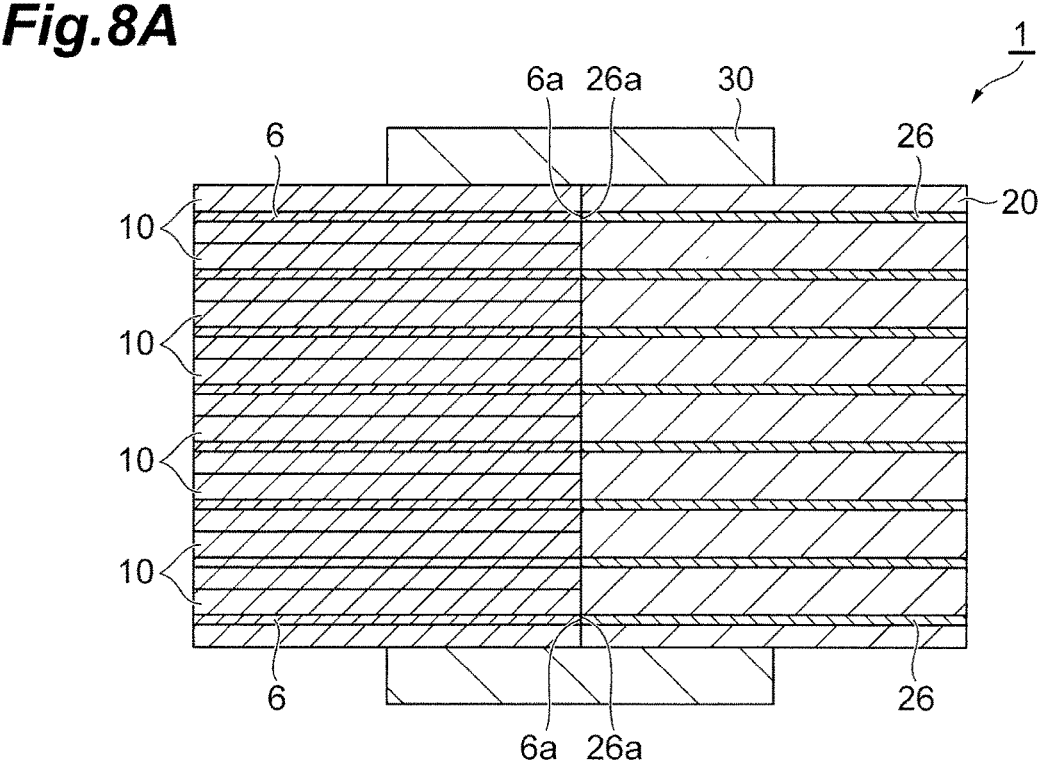
FIG. 8A is a cross-sectional view showing a state where an end of a first optical fiber group and an end of a second optical fiber group are directly butted to each other in an optical cross-connect component.
Figure 8B:
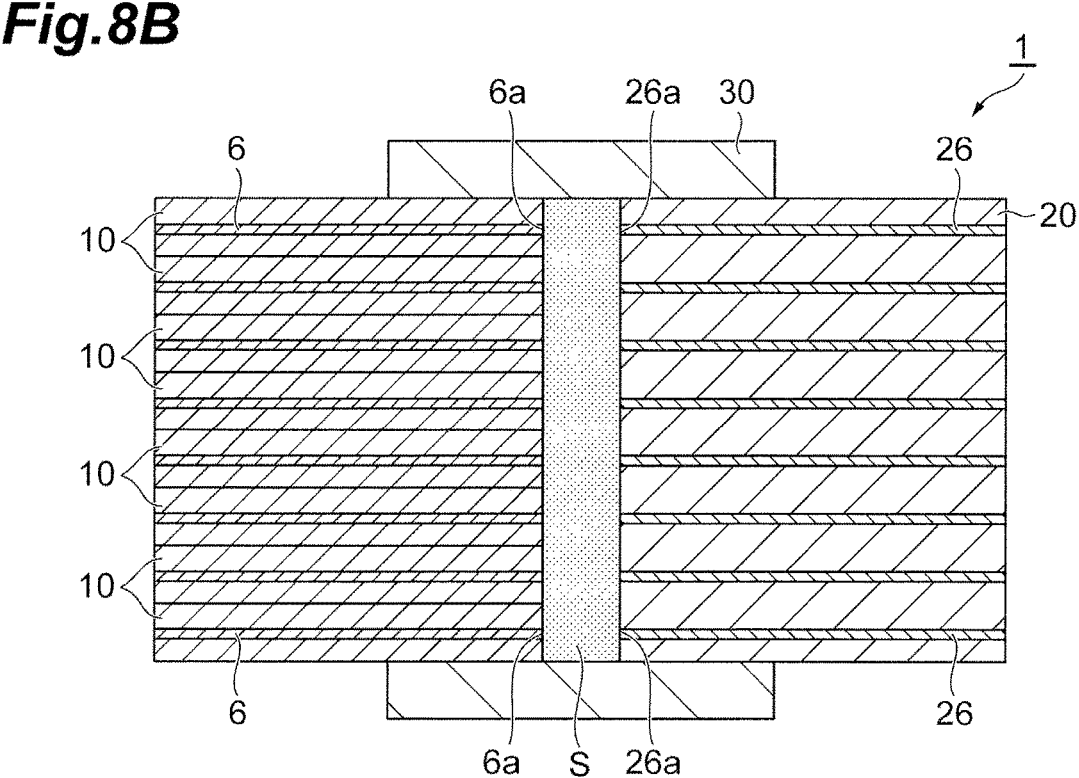
FIG. 8B is a cross-sectional view showing a state where an end of a first optical fiber group and an end of a second optical fiber group are butted to each other via a refractive index matching material in an optical cross-connect component.

In the state where eight first connectors 10 are stacked, the end faces 10b of the first connectors 10 can be arranged in the space SP. At this time, the guide hole 13 of the first connector 10 may be connected with the guide hole 33 of the frame 31 by way of the guide pin 39. This allows a position of the first connector 10 in the space SP to be determined. Similarly, in the state where eight second connectors 20 are stacked, the end faces 20b of the second connectors 20 can be arranged in the space SP. At this time, the guide hole 23 of the second connector 20 may be connected with the guide hole 35 of the frame 31 by way of the guide pin 39. This allows a position of the second connector 20 in the space SP to be determined. In this state, the ends 6a of 64 optical fibers 6 protruding from the end faces 10b of eight first connectors 10 and the ends 26a of 64 optical fibers 26 protruding from the end faces 20b of eight second connectors 20 may be connected so as to be butted to each other (see FIG. 8A). In this case, the ends 6a of the optical fibers 6 on the first connector 10 side and the ends 26a of the optical fibers 26 on the second connector 20 side may be butted to each other via a refractive index matching material S (see FIG. 8B).

In the optical cross-connect component 1 described above, the ends 6a of eight optical fibers 6 housed in the first connector 10 are respectively connected with the ends 26a of the optical fibers 26 housed in eight second connectors 20 different from each other. In other words, the ends 26a of eight optical fibers 26 housed in the second connector 20 are respectively connected with the ends 6a of the optical fibers 6 housed in eight first connectors 10 different from each other. Each of eight second connectors 20 is connected with the end 6a of the optical fiber 6 from each of eight first connectors 10, and thereby specified signals can be collected from the respective first connectors 10 to one second connector 20. In this optical cross-connect component 1, the ends 5a for one optical fiber group 5 and the ends 25a for the other optical fiber group 25 are connected so as to be butted to each other without via a lens. Therefore, there is no restriction by an outside diameter of the lens, and thus, it is possible to easily increase a density of the optical fibers 6 and 26 and further reduce a coupling loss.

The optical cross-connect component 1 includes, as one aspect, the adapter 30 fixing eight first connectors 10 and fixing eight second connectors 20. The adapter 30 is configured to be fixed with both the first connectors 10 and the second connectors 20, thereby positioning of the first connectors 10 and the second connectors 20 can be easily carried out.

In one aspect, the frame 31 of the adapter 30 has the guide holes 33 on the end face 31a for being connected to eight first connectors 10 via the guide pins 39 and the guide holes 35 on the end face 31b for being connected to eight second connectors 20 via the guide pins 39. Since the first connectors 10 and the second connectors 20 are connected to the adapter member 30 by the guide pins 39, positioning of the first connectors 10 and the second connectors 20 can be easily and accurately carried out. The guide hole 33 may not necessarily exist only on the end face 31a, but may penetrate to the end face 31b. Similarly, the guide hole 35 may not necessarily exist only on the end face 31b, but may penetrate to the end face 31a.

In one aspect, the ends 5a for one optical fiber group 5 and the ends 25a for the other optical fiber group 25 may be butted to each other via a refractive index matching material. It is possible to hold stably an optical connection between the end 6a of the optical fiber 6 on one side and the end 26a of the optical fiber 26 on the other side.

Second Embodiment

An optical cross-connect component 101 according to the embodiment is different from the optical cross-connect component 1 of the first embodiment in that the first connectors are directly connected with the second connectors without via the adapter. Hereinafter, a description is mainly given of the difference from the first embodiment, and the same component or member is designated by the same reference sign and the detailed description thereof is omitted. In the embodiment, a description is given of an example where both m and n are "eight" similarly to the first embodiment.

Figure 5A:
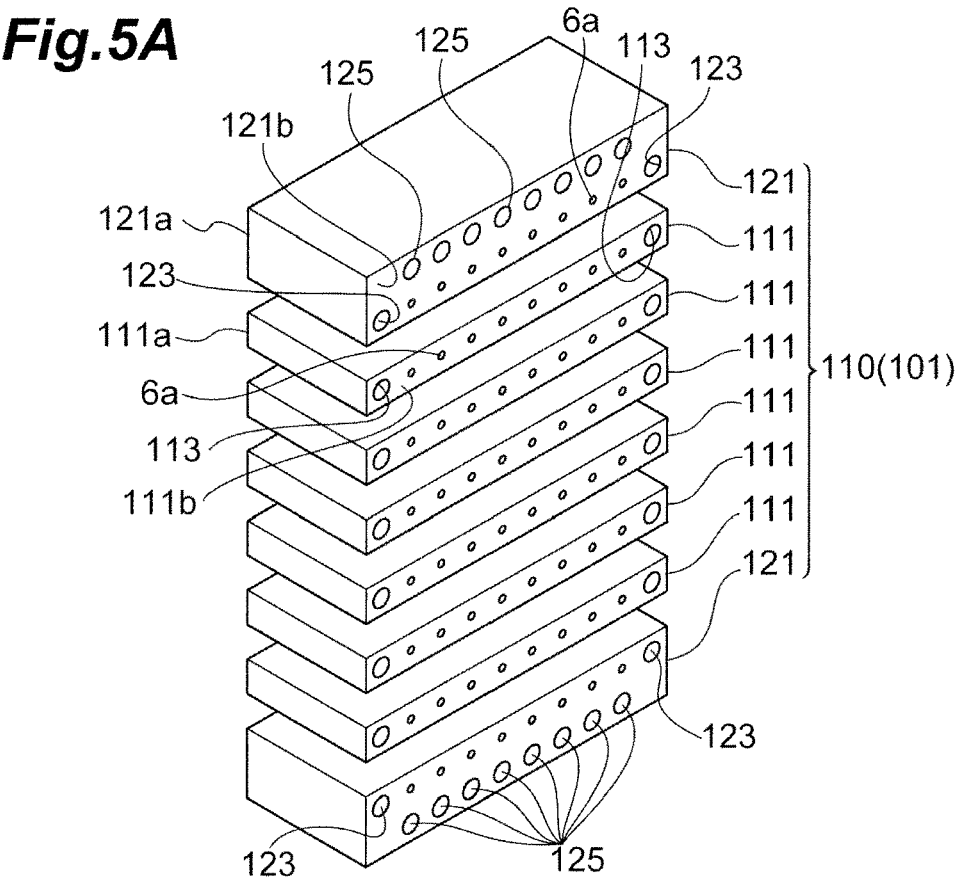
FIG. 5A is a perspective view showing first connectors in an optical cross-connect component according to another embodiment.
Figure 5B:
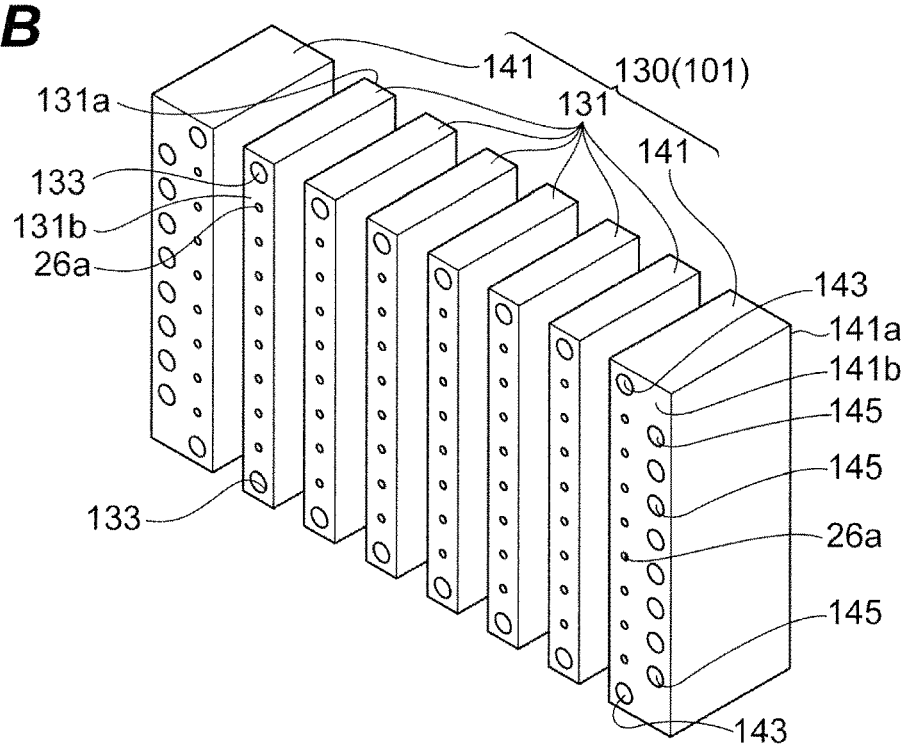
FIG. 5B is a perspective view showing second connectors in the optical cross-connect component according to another embodiment.

FIG. 5A is a perspective view showing a first connector 110 in the optical cross-connect component 101. FIG. 5B is a perspective view showing a second connector 130 in the optical cross-connect component 101. In FIG. 5A and FIG. 5B, a depiction of an entire of the optical fiber groups 5 and 25 is omitted, and depicted are only the ends 6a of the optical fibers protruding from the first connectors 110 and the ends 26a of the optical fibers protruding from the second connectors 130.

As shown in FIG. 5A, the first connector 110 has six first inner connectors 111 arranged in the column direction and a pair of first outer connectors 121 arranged on both end sides in the column direction of six first inner connectors 111. The first inner connector 111, which is, for example, a ferrule, collectively houses ends 6a of eight optical fibers 6 arranged in the row direction. A contour of the first inner connector 111 is plate-shaped extending in the row direction. The first inner connector 111 has an end face 111a where the optical fibers 6 are inserted and an end face 111b on an opposite side of the end face 111a. The optical fiber 6 is housed in the first inner connector 111, and the end 6a protrudes on the end face 111b. Guide holes 113 are formed respectively on both end sides in row direction on the end face 111b of the first inner connector 111. The ends 6a of eight optical fibers 6 are arrayed on the end face 111b of the first inner connector 111 in the row direction.

The first outer connector 121, which is, for example, a ferrule, collectively houses ends 6a of eight optical fibers 6 arranged in the row direction. A contour of the first outer connector 121 is plate-shaped extending in the row direction. The first outer connector 121 has an end face 121a where the optical fibers 6 are inserted and an end face 121b on an opposite side of the end face 121a. The optical fiber 6 is housed in the first outer connector 121, and the end 6a protrudes on the end face 121b. Guide holes 123 are formed respectively on both end sides in row direction on the end face 121b of the first outer connector 121. The ends 6a of eight optical fibers 6 are arrayed on the end face 121b of the first outer connector 121 in the row direction. On the end face 121b, eight guide holes 125 are arrayed in the row direction. In a state where the first outer connectors 121 and the first inner connectors 111 are stacked, a pair of first outer connectors 121 are arranged in such a manner that the guide holes 125 are positioned on both end sides of the first connectors 110 in the column direction.

As shown in FIG. 5B, the second connector 130 has six second inner connectors 131 arranged in the row direction and a pair of second outer connectors 141 arranged on both end sides in the row direction of six second inner connectors 131. The second inner connector 131, which is, for example, a ferrule, collectively houses ends 26a of eight optical fibers 26 arranged in the column direction. A contour of the second inner connector 131 is plate-shaped extending in the column direction. The second inner connector 131 has an end face 131a where the optical fibers 26 are inserted and an end face 131b on an opposite side of the end face 131a. The optical fiber 26 is housed in the second inner connector 131, and the end 26a protrudes on the end face 131b. Guide holes 133 are formed respectively on both end sides in column direction on the end face 131b of the second inner connector 131. The ends 26a of eight optical fibers 26 are arrayed on the end face 131b of the second inner connector 131 in the column direction.

The second outer connector 141, which is, for example, a ferrule, collectively houses ends 26a of eight optical fibers 26 arranged in the column direction. A contour of the second outer connector 141 is plate-shaped extending in the column direction. The second outer connector 141 has an end face 141a where the optical fibers 26 are inserted and an end face 141b on an opposite side of the end face 141a. The optical fiber 26 is housed in the second outer connector 141, and the end 26a protrudes on the end face 141b. Guide holes 143 are formed respectively on both end sides in column direction on the end face 141b of the second outer connector 141. The ends 26a of eight optical fibers 26 are arrayed on the end face 141b of the second outer connector 141 in the column direction. On the end face 141b, eight guide holes 145 are arrayed in the column direction. In a state where the second outer connectors 141 and the second inner connectors 131 are stacked, a pair of second outer connectors 141 are arranged in such a manner that the guide holes 145 are positioned on both end sides of the second connectors 130 in the row direction.

In this embodiment, in the state where the first connectors 110 are stacked, a pitch of the ends 6a of 64 optical fibers 6 is the same length in the row direction and column direction. Similarly, in the state where the second connectors 130 are stacked, a pitch of the ends 26a of 64 optical fibers 26 is also the same length in the row direction and column direction. Then, a pitch on the first connector 110 is the same as a pitch on the second connector 130.

The guide holes 113 and guide holes 123 of the first connectors 110 may be connected with the guide holes 145 of the second connectors 130 by way of the guide pin, and the guide holes 125 of the first connectors 110 may be connected with the guide holes 133 and guide holes 143 of the second connectors 130 by way of guide pins. In this state, the ends 6a of 64 optical fibers 6 protruding from the end faces 111b and 121b of the first connectors 110 and the ends 26a of 64 optical fibers 26 protruding from the end faces 131b and 141b of the second connectors 130 may be connected so as to be butted to each other. In this case, the ends 6a of the optical fibers 6 on the first connector 110 side and the ends 26a of the optical fibers 26 on the second connector 130 side may be butted to each other via a refractive index matching material.

In this embodiment, the first connectors 110 and the second connectors 130 are directly connected via the guide pins, thereby, positioning of the first connectors 110 and the second connectors 130 can be easily and accurately carried out.

Third Embodiment

An optical cross-connect component 201 according to the embodiment is different from the optical cross-connect component 1 of the first embodiment in that the first connectors and the second connectors collectively house the optical fibers arranged in a plurality of rows or a plurality of columns. Hereinafter, a description is mainly given of the difference from the first embodiment, and the same component or member is designated by the same reference sign and the detailed description thereof is omitted. In the embodiment, a description is given of an example where both m and n are "eight" similarly to the first embodiment.

FIG. 6 is a perspective view showing a first connector 210 in the optical cross-connect component 201. The first connector 210 collectively houses ends of eight optical fibers 6 arranged in the row direction. In the embodiment, four first connectors 210 each collectively house the optical fibers 6, the number of which is 16 in total, arranged in two rows. By doing so, at an end face 210b, ends 6a of the optical fibers 6 housed in the first connector 210 are exposed. In the example shown in FIG. 6, one guide hole 13 is formed for each of both sides in the row direction, but two guide holes 13 may be formed for each, for example. FIG. 6 shows the example of collectively housing optical fibers arranged in two rows, but there is no limitation thereto and the optical fibers arranged in two or more rows may be collectively housed in one first connector. In a second connector, the optical fibers arranged in two or more columns may be collectively housed in one second connector, similarly. The second connector 20 in the first embodiment may be used as the second connector.

Fourth Embodiment

An optical cross-connect component 301 according to the embodiment is different from the optical cross-connect component 101 of the second embodiment in that the first connectors and the second connectors collectively house the optical fibers arranged in a plurality of rows or a plurality of columns. Hereinafter, a description is mainly given of the difference from the first and second embodiments, and the same component or member is designated by the same reference sign and the detailed description thereof is omitted. In the embodiment, a description is given of an example where both m and n are "eight" similarly to the second embodiment.

Figure 7:
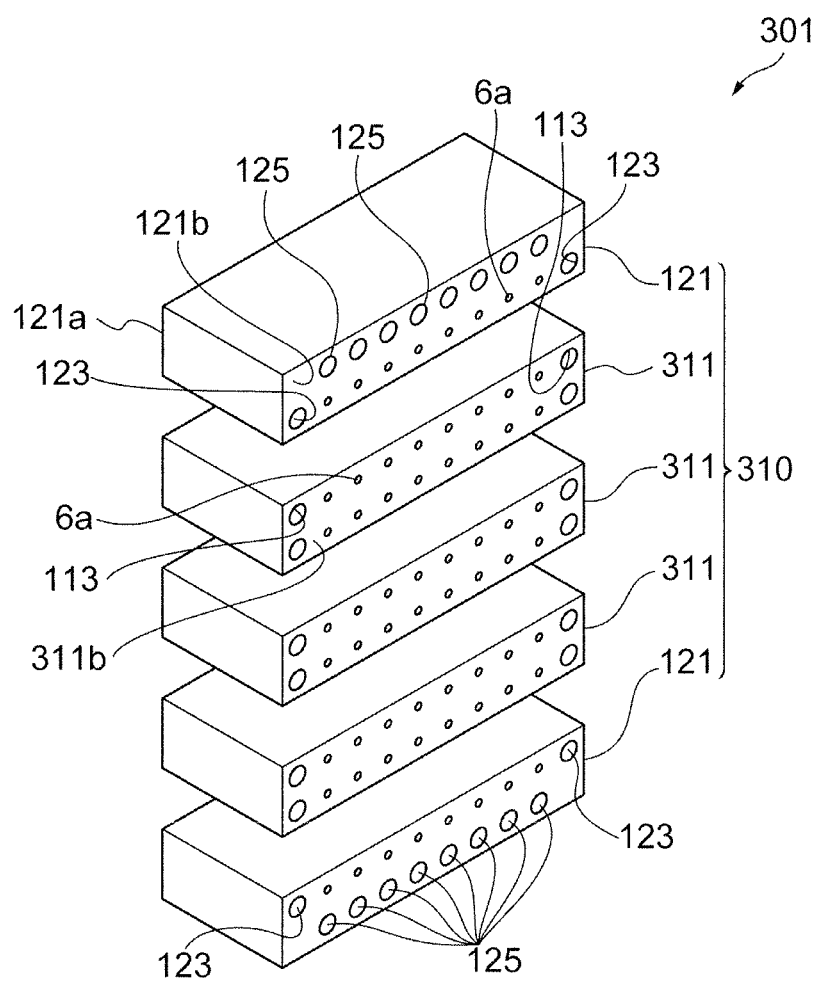
FIG. 7 is a perspective view showing connectors in an optical cross-connect component according to another embodiment.

FIG. 7 is a perspective view showing a first connector 310 in the optical cross-connect component 301. The first connector 310 has three first inner connectors 311 arranged in the column direction and a pair of first outer connectors 121 arranged on both end sides in the column direction of three first inner connectors 311. The first inner connector 311 collectively houses ends of eight optical fibers 6 arranged in the row direction. Three first connectors 311 each collectively house the optical fibers 6, the number of which is 16 in total, arranged in two rows. At an end face 311b, ends 6a of the optical fibers 6 housed in the first inner connector 311 are exposed. FIG. 7 shows the example of collectively housing optical fibers arranged in two rows, but there is no limitation thereto and the optical fibers arranged in two or more rows may be collectively housed in one first inner connector 311. Additionally, in a second connector, the optical fibers arranged in two or more columns may be collectively housed in one second connector, similarly to the first connector 310. In addition, the second connector 130 in the second embodiment may be used as the second connector of this embodiment.

Hereinbefore, the embodiments of the present invention are described in detail with reference to the drawings, but the specific configuration is not limited to these embodiments.

For example, the example is shown where the value of m and the value of n are the same value "8", but there is no limitation thereto. The value of m and the value of n may be different from each other, and may be a desired value such as "16" or "32", so long as it is an integer equal to or more than two. For example, in a case where the value of m is "16" and the value of n is "32", each of a pair of optical fiber groups to be connected has 512 optical fibers arranged in a matrix of 16 rows×32 columns. Each of 16 first connectors houses 32 optical fibers arranged in each row. Each of 32 second connectors houses 16 optical fibers arranged in each column.

What is claimed is:

1. An optical cross-connect component mutually connecting an end of a first optical fiber group and an end of a second optical fiber group, each of the first and second optical fiber groups having m×n optical fibers arranged in a matrix of m rows×n columns at the ends, wherein m and n each represents an integer equal to or more than two, the optical cross-connect component comprising:

a plurality of first connectors housing therein the end of the first optical fiber group, each of the first connectors having at least n holes configured to respectively hold the optical fibers of the first optical fiber group therein; and a plurality of second connectors housing therein the end of the second optical fiber group, each of the second connectors having at least m holes configured to respectively hold the optical fibers of the second optical fiber group therein, wherein the m×n optical fibers in the first optical fiber group are housed in any of the plurality of first connectors, and one first connector of the plurality of first connectors collectively houses therein n optical fibers arranged in at least, any one row of the m rows, wherein the m×n optical fibers in the second optical fiber group are housed in any of the plurality of second connectors, and one second connector of the plurality of second connectors collectively houses therein m optical fibers arranged in at least any one column of the n columns, and wherein the end of the first optical fiber group and the end of the second optical fiber group are connected so as to be butted to each other.

2. The optical cross-connect component according to claim 1, wherein the plurality of first connectors are in first connectors, each first connector collectively housing therein the n optical fibers arranged in each row at the end of the first optical fiber group, and wherein the plurality of second connector are n second connectors, each second connector collectively housing therein the in optical fibers arranged in each column at the end of the second optical fiber group.

3. The optical cross-connect component according to claim 1, further comprising:

an adapter fixing at least one first connector of the plurality of first connectors and fixing at least one second connector of the plurality of second connectors.

4. The optical cross-connect component according to claim 3, wherein the adapter comprises a frame including one end face and other end face opposite to the one end face, and wherein the frame comprise at least one guide hole on the one end flee, for being connected to the first connector via a guide pin and at least one guide hole on the other end face for being connecting to the second connector via a guide pin.

5. The optical cross-connect component according to claim 1, wherein the two first connectors positioned on both ends in a column direction respectively have a guide hole for being connected with at least one second connector of the plurality of second connectors via a guide pin, and wherein the two second connectors positioned on both ends in a row direction respectively have a guide hole for being connected with at least one first connector of the plurality of first connectors via a guide pin.

6. The optical cross-connect component according to claim 2, wherein the two first connectors positioned on both ends in a column direction respectively have it guide holes for being connected with the n second connectors via guide pins, and wherein the two second connectors positioned on both ends in a row direction respectively have m guide holes for being connected with the m first connectors via guide pins.

7. The optical cross-connect component according to claim 1, wherein the end of the first optical fiber group and the end of the second optical fiber group are butted to each other via a refractive index matching material.

* * * * *